US010890112B2

(12) United States Patent
Vialle et al.

(10) Patent No.: US 10,890,112 B2
(45) Date of Patent: Jan. 12, 2021

(54) METHOD OF INCREASING THE SAFETY OF A POWER PLANT, AND A POWER PLANT SUITABLE FOR IMPLEMENTING THE METHOD

(71) Applicant: Airbus Helicopters, Marignane (FR)

(72) Inventors: Michel Vialle, Aix en Provence (FR); Alban Corpron, Salon de Provence (FR); Frederic Dyrla, Bouc Bel Air (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 16/372,696

(22) Filed: Apr. 2, 2019

(65) Prior Publication Data

US 2019/0226399 A1 Jul. 25, 2019

Related U.S. Application Data

(60) Division of application No. 14/931,066, filed on Nov. 3, 2015, now Pat. No. 10,287,978, which is a
(Continued)

(30) Foreign Application Priority Data

Dec. 11, 2009 (FR) ..................................... 09 06012

(51) Int. Cl.
*F02C 3/30* (2006.01)
*F01D 15/12* (2006.01)
(Continued)

(52) U.S. Cl.
CPC .............. *F02C 3/305* (2013.01); *F01D 15/12* (2013.01); *F01D 25/18* (2013.01); *F01D 25/22* (2013.01);
(Continued)

(58) Field of Classification Search
CPC .......... F02C 3/305; F01D 15/12; F01D 25/18; F16H 57/045; F05D 2220/329
See application file for complete search history.

(56) References Cited

U.S. PATENT DOCUMENTS 4,284,174 A * 8/1981 Salvana .................. F01D 25/18
184/6.26
4,383,647 A * 5/1983 Woodruff .................. F02K 1/16
239/265.19
(Continued)

FOREIGN PATENT DOCUMENTS

EP 0900954 A1 3/1999
EP 1188922 A2 * 3/2002 ......... F16H 57/0413
(Continued)

OTHER PUBLICATIONS

French Search Report and Written Opinion for Application No. FR 0906012, dated Jul. 9, 2010, 7 pages.
(Continued)

*Primary Examiner* — Gerald L Sung
*Assistant Examiner* — Marc J Amar
(74) *Attorney, Agent, or Firm* — Brooks Kushman P.C.

(57) ABSTRACT

The present invention relates to a method of increasing the safety of a power plant provided with at least one heat engine and a gearbox (BTP), the engine driving the gearbox (BTP), the gearbox (BTP) having a lubrication system implemented using an aqueous medium stored in a reserve, in which method a fluid comprising water is injected into the heat engine to increase the power developed by the heat engine without increasing the temperature of a member of the heat engine or to decrease the temperature without modifying the power developed by the engine, the fluid being taken from the reserve.

20 Claims, 4 Drawing Sheets

Related U.S. Application Data continuation of application No. 12/961,980, filed on Dec. 7, 2010, now Pat. No. 9,206,739.

(51) Int. Cl.
*F01D 25/18* (2006.01)
*F01M 11/02* (2006.01)
*F01D 25/22* (2006.01)
*F16H 57/04* (2010.01)

(52) U.S. Cl.
CPC ....... *F01M 11/02* (2013.01); *F05D 2220/329* (2013.01); *F05D 2260/4031* (2013.01); *F05D 2260/98* (2013.01); *F16H 57/045* (2013.01)

(56) References Cited

U.S. PATENT DOCUMENTS

| | | | |
|---|---|---|---|
| 4,467,892 A | 8/1984 | Van de Bogert | |
| 4,619,110 A | 10/1986 | Moore | |
| 4,717,000 A * | 1/1988 | Waddington | F01D 25/18 |
| | | | 184/6.1 |
| 4,738,098 A | 4/1988 | McMahon | |
| 4,823,546 A | 4/1989 | Cheng | |
| 4,860,972 A * | 8/1989 | Lannerd | B64D 37/04 |
| | | | 244/135 R |
| 5,344,101 A | 9/1994 | Francois | |
| 6,321,525 B1 * | 11/2001 | Rogers | F01D 17/06 |
| | | | 60/39.281 |
| 6,408,812 B1 * | 6/2002 | Chamberlin, III | C10M 169/04 |
| | | | 123/196 R |
| 6,438,963 B1 | 8/2002 | Traver et al. | |
| 6,491,255 B1 * | 12/2002 | Bracken | B64D 37/04 |
| | | | 220/4.15 |
| 6,520,136 B2 | 2/2003 | Ito et al. | |
| 7,104,503 B1 * | 9/2006 | Callahan | B64D 37/12 |
| | | | 244/137.1 |
| 7,387,189 B2 | 6/2008 | James et al. | |
| 7,500,542 B2 | 3/2009 | Maret et al. | |
| 8,020,665 B2 | 9/2011 | Sheridan et al. | |
| 8,230,835 B2 | 7/2012 | Gibson et al. | |
| 2002/0195296 A1 * | 12/2002 | Maret | F16N 17/00 |
| | | | 184/6.22 |
| 2003/0217553 A1 | 11/2003 | Gadde et al. | |
| 2005/0034463 A1 | 2/2005 | Simpson et al. | |
| 2005/0056724 A1 | 3/2005 | Greene | |
| 2005/0166570 A1 * | 8/2005 | Granitz | F01D 25/18 |
| | | | 60/39.08 |
| 2005/0234689 A1 | 10/2005 | Gates et al. | |
| 2006/0054406 A1 * | 3/2006 | Delaloye | F01D 25/18 |
| | | | 184/6.11 |
| 2006/0080969 A1 | 4/2006 | Greene | |
| 2007/0261922 A1 * | 11/2007 | Mullen | F16H 57/045 |
| | | | 184/6.12 |
| 2007/0264133 A1 * | 11/2007 | Schwarz | F02K 3/06 |
| | | | 417/110 |
| 2008/0097703 A1 | 4/2008 | Francois | |
| 2008/0110596 A1 * | 5/2008 | Schwarz | F16N 7/38 |
| | | | 184/6.4 |
| 2008/0121376 A1 * | 5/2008 | Schwarz | F02C 9/48 |
| | | | 184/6.4 |
| 2008/0125931 A1 | 5/2008 | Gaulmin et al. | |
| 2008/0196974 A1 * | 8/2008 | Galivel | F02C 9/48 |
| | | | 184/6.4 |
| 2009/0071753 A1 * | 3/2009 | Carnelli | F16N 7/38 |
| | | | 184/6.4 |
| 2009/0125205 A1 | 5/2009 | Lardillon | |
| 2009/0182473 A1 | 7/2009 | Lopez | |
| 2009/0188031 A1 | 7/2009 | Dwyer et al. | |
| 2009/0249794 A1 | 10/2009 | Wilkes et al. | |
| 2009/0277298 A1 | 11/2009 | Mayr | |
| 2010/0242490 A1 * | 9/2010 | Symonds | F02C 3/305 |
| | | | 60/775 |
| 2011/0030385 A1 * | 2/2011 | Ellans | F02C 7/262 |
| | | | 60/786 |
| 2011/0239656 A1 * | 10/2011 | Crume | F02C 3/305 |
| | | | 60/775 |
| 2012/0143482 A1 * | 6/2012 | Goossen | G08G 5/0034 |
| | | | 701/120 |
| 2012/0285175 A1 | 11/2012 | Fletcher et al. | |
| 2015/0225090 A1 * | 8/2015 | Landre | B64D 33/08 |
| | | | 60/779 |
| 2015/0315965 A1 * | 11/2015 | Moine | F02C 3/305 |
| | | | 60/775 |
| 2017/0233103 A1 * | 8/2017 | Teicholz | B64F 1/34 |
| | | | 701/100 |
| 2019/0136727 A1 * | 5/2019 | Lamb | F16H 57/045 |

FOREIGN PATENT DOCUMENTS

| | | | | |
|---|---|---|---|---|
| EP | 1188922 A2 | 3/2002 | | |
| FR | 2826094 A1 | 12/2002 | | |
| FR | 2859761 A1 | 3/2005 | | |
| GB | 327211 A * | 4/1930 | ........... | B64C 27/025 |
| JP | 2005048646 A | 2/2005 | | |
| JP | 2005240573 A | 9/2005 | | |
| KR | 2019990025152 U | 7/1999 | | |
| WO | 2006081334 A2 | 8/2006 | | |

OTHER PUBLICATIONS

English translation of Korean Office Action for Application No. 10-2010-0126343, dated Sep. 28, 2012, 3 pages.

* cited by examiner

METHOD OF INCREASING THE SAFETY OF A POWER PLANT, AND A POWER PLANT SUITABLE FOR IMPLEMENTING THE METHOD

CROSS-REFERENCE TO RELATED APPLICATIONS

This application is a divisional of U.S. application Ser. No. 14/931,066 filed Nov. 3, 2015 and now U.S. Pat. No. 10,287,978, which is a continuation of U.S. application Ser. No. 12/961,980 filed Dec. 7, 2010 and now as U.S. Pat. No. 9,206,739, which, in turn, claims the benefit of FR 09 06012 filed Dec. 11, 2009, the disclosures of which are incorporated in their entirety by reference herein.

TECHNICAL FIELD

The present invention relates to a method of increasing the safety of a power plant, and to a power plant suitable for implementing the method.

More particularly, the invention relates to a power plant for a rotorcraft, and in particular for a helicopter. The technical field of the invention is thus the technical field of power plants, in particular for aircraft of the rotorcraft type.

BACKGROUND

A rotorcraft has a power plant for setting its rotary wing into rotation. The power plant is provided with one or more heat engines for driving the gearing of a power transmission gearbox, referred to as the main gearbox in a helicopter, said gearbox then driving the rotary wing in rotation.

The gearbox includes mechanical moving elements, such as gears and shafts, that come into contact with one another. Friction between these mechanical elements gives rise to heating that, in the long run, and if no precautions are taken tends to cause the mechanical elements to jam.

In order to avoid destroying the gearbox, it is provided with a main lubrication circuit, and advantageously with a secondary lubrication circuit. Reference may be made for example to document FR 2 826 094. The lubricant projected in the form of a jet or indeed a mist serves to cool the mechanical elements so as to limit heating thereof.

Lubrication may be performed using a lubricant of the oil type.

In a variant, it is possible to use a fluid having high latent heat suitable for absorbing a large amount of heat on changing state from a liquid state to a gaseous state. Thus, the lubricant may be pure water or a mixture that is based on water, antifreeze, and lubricant. For example, the lubricant generally known under the name glycol comprises water, 10% to 20% ethylene glycol for retarding a change from the liquid state to the solid state, 0.1% to 1% sodium sulfide, and benzothiazole-2-yl, or highly refined mineral oils. Consequently, it is possible to consider using the mixture described by the standard NF E48-602, in category HFC.

Furthermore, it should be observed that throughout the present specification, the term "heat engine" is used to cover not only turbine engines, but also piston engines.

Each heat engine is suitable for operating at a plurality of power ratings.

For example, thermal limits of a heat engine and torque limits of the gearbox enable three normal ratings to be defined for the use of the heat engine of a rotorcraft:

takeoff rating, corresponding to use that damages neither the gearbox nor the heat engine over a limited takeoff duration, usually lying in the range five minutes to thirty minutes, with this being known as maximum takeoff power (TOP);

maximum continuous power corresponding to use that damages neither the gearbox nor the heat engine during unlimited use, with this being referred to as maximum continuous power (MCP); and maximum transient rating, possibly limited by regulation: this is referred to as maximum transient power (MTP).

There also exist higher power contingency ratings for multi-engined rotorcraft, that are used in the event of one heat engine being inoperative (OEI):

the first contingency rating during which the capabilities of the gearbox on its inlet stages and the thermal capabilities of the heat engine are used to the maximum: this may also be referred to as super-emergency power (PSU) or 30-sec OEI since it can be used for a maximum of thirty consecutive seconds, and at least three times during a flight; if 30-sec OEI is used, then it may be necessary to remove and overhaul the heat engine;

the second contingency rating in which the capabilities of the gearbox concerning its inlet stages and the capabilities of the heat engine are used very largely: this is referred to as maximum emergency power (PMU) or two min OEI since it can be used for two minutes after thirty sec OEI or for two minutes and thirty seconds consequently, at most; and the third contingency rating during which the capabilities of the gearbox concerning its inlet stages and the thermal capabilities of the heat engine are used without damaging them: this is referred to as intermediate emergency power (PIU) or MCP OEI that can be used for thirty minutes or continuously for the remainder of the flight after a heat engine has become inoperative.

Nevertheless, the power developed by the heat engine at any particular rating may be found to be insufficient in special circumstances, e.g. in a hot atmosphere.

For example, the 30-sec OEI rating may be sufficient to allow the pilot to land the aircraft, while being insufficient to enable the mission to be terminated. In addition, the length of time this super-emergency power can used may be only just sufficient or may even be insufficient to guarantee aircraft safety.

It is known to inject pure water or a mixture of water and alcohol into a turbine engine in order to increase the power it develops without changing the temperature at the outlet from the combustion chamber. For example, with a free turbine engine, pure water or such a mixture is injected in order to increase the power developed without increasing the temperature of the gas at the outlet from the combustion chamber, where said temperature is referred to as the "T4 temperature" both by the person skilled in the art, and below in the present specification.

Pure water injection was used in piston engines during World War II and has subsequently been used on turbojet airplanes.

Water may be injected into the combustion chamber of the heat engine. This changes the composition of the gas generated by the gas generator. This results in a change in the heat capacity and in the specific enthalpy (enthalpy per unit mass) of the gas. For unchanging flow rate of gas created in the combustion chamber, the power generated by the heat engine increases with increasing specific enthalpy of the gas that is created.

Under such circumstances, in a turbine engine, injecting water enables gas to be expanded at greater specific enthalpy at constant temperature T4, while also increasing the flow rate of air through the turbine. The power developed by the turbine engine is thus increased.

Nevertheless, the fuel flow rate is increased at constant temperature T4 in the combustion chamber, insofar as the energy absorbed by vaporizing water in the combustion chamber needs to be compensated by delivering additional heat.

When the heat engine is a turbine engine having a gas generator with an air inlet and a compressor upstream from a combustion chamber, the water may be injected into the air inlet.

Under such circumstances, the total mass flow rate through the air inlet is increased, thereby delivering additional power at constant specific enthalpy. The power available at constant temperature T4 and at constant air flow rate is thus increased.

Nevertheless, the fuel flow rate is also increased for constant temperature and constant air flow rate.

It should be observed that unlike the above circumstance, the operating point of the compressor is modified. In addition, the compressor generally needs to work harder in order to deliver the energy needed for evaporating the liquid water.

Water may be injected in the form of a mist. In order for the method to be advantageous, it is necessary for the mist to be sufficiently fine to enable the water to evaporate prior to entering into the compressor. Under such circumstances, the temperature at the inlet to the compressor decreases, thus enabling higher overall efficiency to be obtained and a greater mass flow rate. Nevertheless, the compressor must deliver more work insofar as the mass flow rate is greater. Furthermore, the operating point of the compressor is modified, with some of the surplus enthalpy that is generated serving to satisfy this additional need for power.

In addition, although the gain in power is positive, it is not obvious, a priori, that the efficiency of the turbine will be better when water is injected. Injecting water requires a higher fuel flow rate and that leads to higher specific consumption.

Furthermore, and above all, the use of the technique of injecting a water-based fluid requires a device to be implemented that has a reserve containing said fluid and a control member that manages the injection of the fluid. That device consequently increases the weight of the power plant. The gains achieved under certain circumstances by such a device are potentially limited or indeed completely lost by the increase in weight associated with the presence of an additional device.

SUMMARY

An object of the present invention is thus to propose a method enabling the safety of a power plant to be increased and thus the safety available to an aircraft as a result of its power plant, while avoiding a large resulting increase in the weight of the power plant.

The invention provides a method of increasing the safety of a power plant provided with at least one heat engine and a gearbox, the heat engine driving the gearbox, the gearbox having a main and/or emergency lubrication system implemented using an aqueous medium including water stored in a reserve, which method is remarkable in particular in that during said method a fluid is injected into the heat engine to increase the power developed by the heat engine without increasing the temperature of a member of the engine, or to decrease the temperature of said member without modifying the power developed by the heat engine, the fluid being taken from said reserve.

In other words, a fluid that contains water is injected into the heat engine to obtain at least one situation occurs as listed in a catalog of predetermined situations. This catalog comprises at least one of the following situations:

increasing the power developed by the heat engine without increasing the temperature of a member of the heat engine, e.g. the inlet to a free turbine stage of a turbine engine; and decreasing the temperature of a member of the heat engine without modifying the power developed by the heat engine, e.g. the temperature T4 at the inlet to a free turbine stage of a turbine engine.

The combination particularly characterizing this method has the result of giving rise to extra power or of prolonging the duration for which a particular rating may be used, for example.

The invention proposes injecting a water-based fluid into the heat engine so as to enable a power level to be used for longer. Thus, a pilot may request a water-based fluid to be injected into the heat engine if extra power is required or if it is necessary to prolong the duration for which the power developed at a given instant is to be used.

This result thus increases the safety of the power plant. Since the power plant is arranged on a vehicle, e.g. of the rotorcraft type, the safety margins provided by the power plant to the vehicle are increased by injecting fluid.

The fluid is taken from the reserve that feeds the system for lubricating the gearbox, which may be a main or an emergency lubrication system.

Thus, there is no need to provide a dedicated reserve, unlike that which is suggested in the prior art. This minimizes the extra weight constituted by the system for injecting fluid into the heat engine. It should be observed that injection may also be controlled using existing means, namely the member for regulating the heat engine, or indeed the control means of the lubrication system for the gearbox.

The invention therefore does not give rise to an unacceptable increase in weight, contrary to presently existing prejudices.

The invention may also include one or more of the following additional characteristics.

Furthermore, for a movable member that is to be set into motion at a speed limited by a given maximum speed at each instant, the fluid is injected when the movable member is moving at a speed faster than the given maximum speed. The movable member may be a free turbine of a turbine engine or a piston of a piston engine. Similarly, the movable member may be the outlet shaft of the heat engine.

For example, in the event of a breakdown in the system for regulating the rate at which fuel is delivered to the heat engine, the heat engine may start to race. The movable member then reaches a forbidden speed greater than a maximum speed for which the heat engine is designed, which maximum speed is specified by the manufacturer. Conventionally, the person skilled in the art says that the heat engine is in overspeed. This phenomenon is severe insofar as it has the consequence of the heat engine exploding.

Consequently, when the pilot or dedicated means detect overspeed, fluid is injected into the heat engine without injecting additional fuel so as to reduce the calorific value of the combination comprising the fuel and the fluid.

The effect of the fluid may be maximized by injecting it into the combustion chamber of the heat engine together with the fuel, and thus via the fuel injectors. The fluid tends to replace a fraction of the fuel. This serves to reduce the speed of the movable member by smothering the heat engine, with the smothering limiting the amount of fuel that is fed to the combustion chamber of the heat engine.

Conversely, for a movable member that is to be set into motion at a speed limited by a given minimum speed at each instant, the fluid is injected when the movable member is moving at a speed slower than the given minimum speed.

In this situation, a failure causes the heat engine to slow down. Consequently, the movement speed of the movable member, a turbine or an outlet shaft or indeed a piston for example, becomes lower than a minimum movement speed that is determined and that is set out in limits specified by the manufacturer.

By injecting fluid into the heat engine, and increasing the fuel flow rate, the power developed by the heat engine is increased.

Injection may be required by the pilot on detecting the failure, or alternatively it may be required by a control member.

When the heat engine is a turbine engine having a free turbine and a gas generator, the fluid is injected when a monitored parameter crosses a predetermined threshold by becoming greater than a maximum predetermined threshold or less than a minimum predetermined threshold, the monitored parameter forming part of a first predetermined list comprising at least one of the following parameters: the speed of rotation of the gas generator; the speed of rotation of the free turbine; the temperature of the gas at the inlet to the free turbine; and the flow rate of fuel feeding the heat engine.

In the event of heat engine overspeed, it is found that at least one of the monitored parameters is greater than a maximum predetermined threshold, whereas when extra power is required, or when idling, at least one of said monitored parameters is less than a minimum predetermined threshold.

In other words, the fluid is injected if the value of the monitored parameter is greater than a given maximum threshold for said parameter, or if the value of the monitored parameter is less than a given minimum threshold for said parameter.

As a function of the parameter or of the threshold in question, i.e. a minimum threshold or a maximum threshold, different points may be selected for injecting the fluid. For example, provision may be made to inject the fluid together with the fuel in the event of a maximum threshold being exceeded, and to inject the fluid separately from the fuel in the event of dropping below a minimum threshold.

Furthermore, the fluid may be taken from a second predetermined list, the second list including at least one of the following aqueous solutions: pure water; a first mixture of pure water and an antifreeze; and a second mixture of pure water with at least an antifreeze and a lubricant. For example, the second mixture contains water, an antifreeze having 10% to 20% ethylene glycol to retard its passage from a liquid state to a solid state, a lubricant having 0.1% to 1% sodium sulfide, and benzothiazole-2-yl, or indeed highly refined mineral oils.

Thus, the power plant may contain a first bottle of pure water and a second bottle containing an intermediate solution comprising either an antifreeze e.g. of the above-specified type, or a third mixture comprising at least an antifreeze and a lubricant e.g. of the above-specified type, it being possible to inject a fluid into the heat engine or into the gearbox, e.g. when a system for lubricating said gearbox is no longer operative, use is made solely of the first bottle for feeding the heat engine when the fluid is for the heat engine, and the pure water from the first bottle is mixed with the intermediate solution from the second bottle when the fluid is for the gearbox.

In other words, the first bottle of the reserve includes the fluid for injecting into the heat engine, and the second bottle includes additional ingredients for injecting fluid into the gearbox. Pure water constitutes the fluid for injection into the heat engine, whereas the fluid injected into the gearbox comprises an aqueous medium resulting from mixing said fluid with additional ingredients.

Each element, i.e. the gearbox and the heat engine, then receives a fluid that is optimized for its own application.

According to another aspect, for the power plant including two heat engines suitable for operating at at least a first rating when none of the heat engines is inoperative and at least one emergency rating when one of the heat engines is inoperative, the working heat engine developing super-emergency power for a predetermined duration during the emergency, with the fluid being injected to increase the super-emergency power or to lengthen the predetermined duration.

Concerning this injection of fluid, for the heat engine being a turbine engine having a free turbine and a gas generator, the gas generator including an air inlet and a combustion chamber into which a fuel is injected, the fluid is injected using an injection process selected from a third predetermined list comprising at least one of the following injection processes:

the fluid is injected into a fuel feed pipe for feeding the heat engine, so as to be sent into the combustion chamber together with the fuel;

the fluid is injected into the combustion chamber in order to be injected into the combustion chamber independently of the fuel; and the fluid is injected into the air inlet.

The fluid may also be delivered by a spray nozzle in the form of a mist, where appropriate.

It should be observed that the destination of the fluid may vary depending on requirements. For example, in a manual embodiment, the pilot may have a selector switch for selecting the various solutions of the third predetermined list, and may select a particular solution by positioning the selector switch on the selected solution.

In an automatic embodiment, a processor type control member associated with a memory uses preprogrammed relationships to determine whether it should inject a fluid into the heat engine. If so, it determines where it should inject the fluid and possibly even the nature of the fluid to be injected, i.e. pure water or a specific mixture.

In addition to a method, the invention also provides a power plant suitable for implementing said method, the power plant being provided with at least one heat engine and with a gearbox and a reserve of fluid, the heat engine driving said gearbox.

This power plant is remarkable in that the fluid reserve is hydraulically connected via a hydraulic connection to the gearbox and to each heat engine to lubricate the gearbox and to increase the power of the heat engine without increasing the temperature of the heat engine or to reduce the temperature of the heat engine without reducing the power of the heat engine, the power plant including at least one main closure means between each heat engine and the reserve, and at least one secondary closure means between the gearbox and the reserve, the power plant including a control member for controlling the main and secondary closure means.

Furthermore, it should be observed that each main closure means may be distinct from each secondary closure means.

The control member may optionally be a processor provided with a memory, the control member controlling the main and secondary closure means using preprogrammed relationships or in response to an order from the pilot, the order possibly coming from a selector type knob, for example.

In addition, the reserve is filled with an aqueous medium suitable for feeding the heat engine with a fluid, and/or for feeding the gearbox with a fluid.

The power plant may also include one or more of the following characteristics.

Thus, there are closure means between each fluid injection zone and the reserve.

In a variant, each main closure means comprises a main admission valve, and each secondary closure means comprises a secondary admission valve.

For the hydraulic connection including at least one injection pipe connecting the reserve to a zone for injecting fluid into a heat engine, each injection pipe is provided with a respective main admission valve. Similarly, for the hydraulic connection including at least one duct connecting the reserve to a zone for injecting fluid into the gearbox with the reserve, each duct is provided with a secondary admission valve.

Each admission valve is physically distinct from any other admission valve.

Conversely, in another variant, each of the closure means is incorporated in a single hydraulic distributor that performs the role of the main and secondary admission valves. The hydraulic distributor is connected to the reserve and to each of the injection zones, with it being possible for the distributor to feed one or more injection zones as a function of orders it receives.

Furthermore, for the gearbox including at least one member to be lubricated, e.g. a gear, the hydraulic connection includes a duct opening out into an injection nozzle directed towards the member, the nozzle being suitable for injecting a fluid from the reserve in the form of a jet or a mist.

Furthermore, for the heat engine being a turbine engine having a free turbine and a gas generator, and for the gas generator comprising an air inlet and a combustion chamber into which a fuel is injected, the hydraulic connection comprises at least one injection pipe selected from a fourth predetermined list comprising at least one of the following injection pipes:
  a first injection pipe opening out into a fuel feed pipe of the heat engine in order to be sent into the combustion chamber together with the fuel;
  a second injection pipe opening out into the combustion chamber in order to inject the fluid into the combustion chamber independently of the fuel; and
  a third injection pipe opening out into the air inlet.
Furthermore, the reserve may comprise:
  either a single bottle provided with a fluid for injecting into the heat engine;
  or else a first bottle filled with pure water and a second bottle filled with an intermediate solution including an antifreeze, or a third mixture of at least an antifreeze and a lubricant, the first and second bottles opening out into a mixer connected to said hydraulic connection.

In addition, the reserve may be fitted with a system for heating the fluid so as to prevent the fluid from freezing. For example, the system may be constituted by electrical resistance elements suitable for being powered by the electricity network of the aircraft, each bottle then including at least one resistance element.

Finally, the reserve includes at least one bottle, and the reserve is provided with one transfer pump per bottle. Optionally, the control module varies the pressure at which the fluid is transferred as a function of its destination.

BRIEF DESCRIPTION OF THE DRAWINGS

The invention and its advantages appear in greater detail in the context of the following description with embodiments given by way of illustration and with reference to the accompanying figures, in which.

Figure 1:
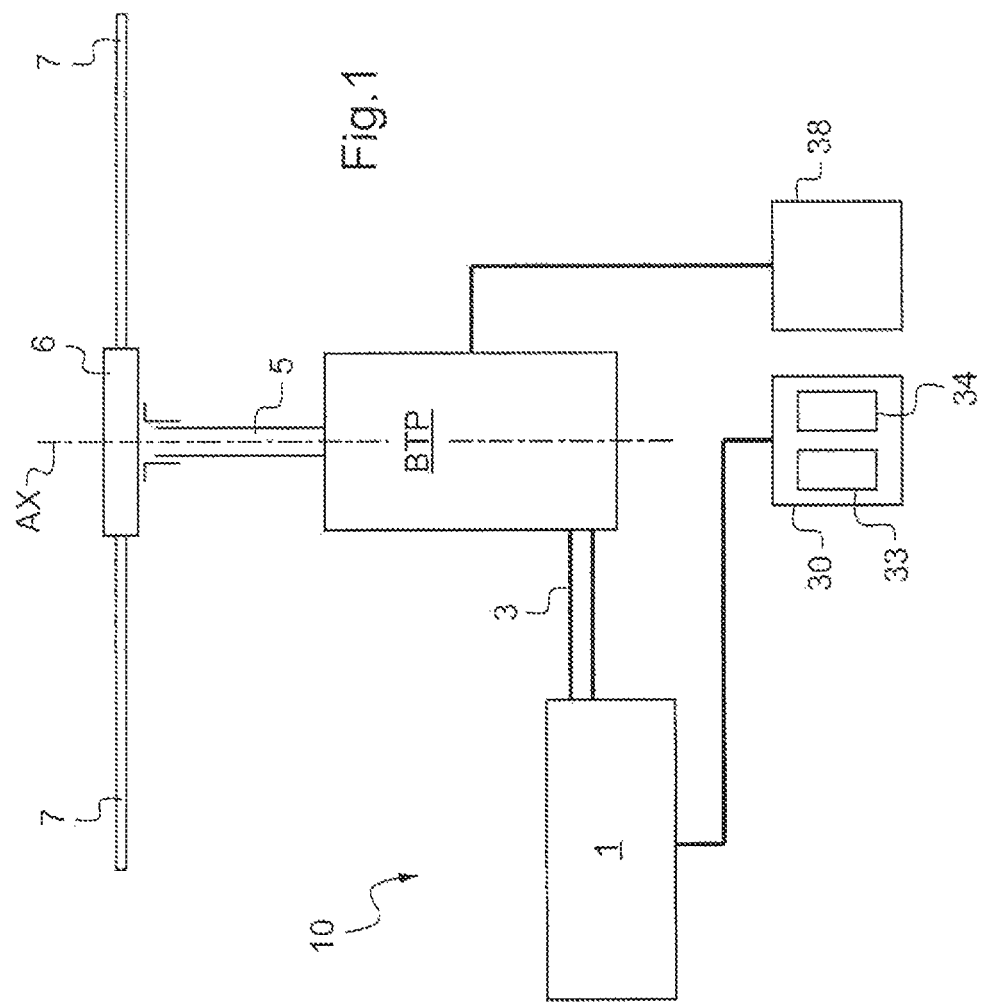
FIG. 1 is a diagram explaining the method of the invention.

Elements that are present in more than one of the figures are given the same references in each of them.

DETAILED DESCRIPTION

The present invention relates to a method of making safe a power plant 10, the power plant 10 including at least one heat engine 1 driving a power transmission gearbox BTP.

In a rotorcraft, and in particular a helicopter, the gearbox BTP drives a rotor mast 5 in rotation about an axis of rotation AX, the rotor mast 5 being secured to a hub 6 carrying a plurality of blades 7. Such a gearbox BTP is known as a main gearbox.

According to the invention, the power plant includes a reserve 30 filled with a fluid comprising water connected to the main gearbox BTP and to the heat engine 1. Thus, the reserve is filled with a fluid that is suitable for being injected into the heat engine 1 and/or into the main gearbox BTP.

The fluid may be selected from a list referred to as the second predetermined list, this list including at least one of the following aqueous solutions: pure water; a first mixture of pure water and antifreeze of the ethylene glycol type; and a second mixture of pure water with at least an antifreeze and a lubricant.

The reserve 30 may include a single bottle filled with such fluid, or a plurality of bottles 33, 34 serving to contain the various ingredients of the fluid.

Under such circumstances, in compliance with the method of the invention, the fluid is injected into the heat engine 1 in order to achieve at least one situation contained in the catalog of predetermined situations. This catalog comprises at least one of the following situations:
  an increase in the power developed by the heat engine 1 without increasing the temperature of a member of the heat engine, e.g. the inlet to the free turbine stage;
  a decrease in the temperature of a member of the heat engine without modifying the power developed by the heat engine, e.g. the temperature T4 at the inlet to the free turbine stage of a turbine engine.

In addition, the catalog may also comprise one or more of the following additional situations:
  for a moving member that is to be set into movement at a speed limited by a given maximum speed at each instant, the fluid is injected when the moving member moves at a speed that is faster than said given maximum speed;
  for a moving member that is to be set into movement at a speed limited by a given minimum speed at each instant, said fluid is injected when said moving member is moving at a speed slower than said given minimum speed;

for the heat engine 1 being a turbine engine having a free turbine and a gas generator, said fluid is injected when a monitored parameter crosses a predetermined threshold, i.e. on going below a minimum threshold or above a maximum threshold, the monitored parameter forming part of a first list including at least one of the following parameters: the speed of rotation Ng of said gas generator; the speed of rotation NTL of the free turbine; the temperature T4 of the gas at the inlet to the free turbine; and the flow rate Q of fuel feeding the heat engine; and for a power plant having two heat engines suitable for operating at at least a first rating when neither of the heat engines is inoperative and at least one emergency rating when one of the engines is inoperative, with the working engine developing super-emergency power PSU for a predetermined duration D1 during said emergency, the fluid is injected in order to increase the super-emergency power PSU and to lengthen the predetermined duration D1.

Furthermore, in the method, when the heat engine is a turbine engine having a free turbine and a gas generator, the gas generator including an air inlet and a combustion chamber into which a fuel is injected, the fluid is injected using an injection process selected from a third list comprising at least one of the following injection processes:

the fluid is injected into a fuel feed pipe of the heat engine 1 so as to be delivered into the combustion chamber together with the fuel;

the fluid is injected into the combustion chamber in order to be injected into said combustion chamber independently of the fuel; and said fluid is injected into the air inlet.

Figure 2:
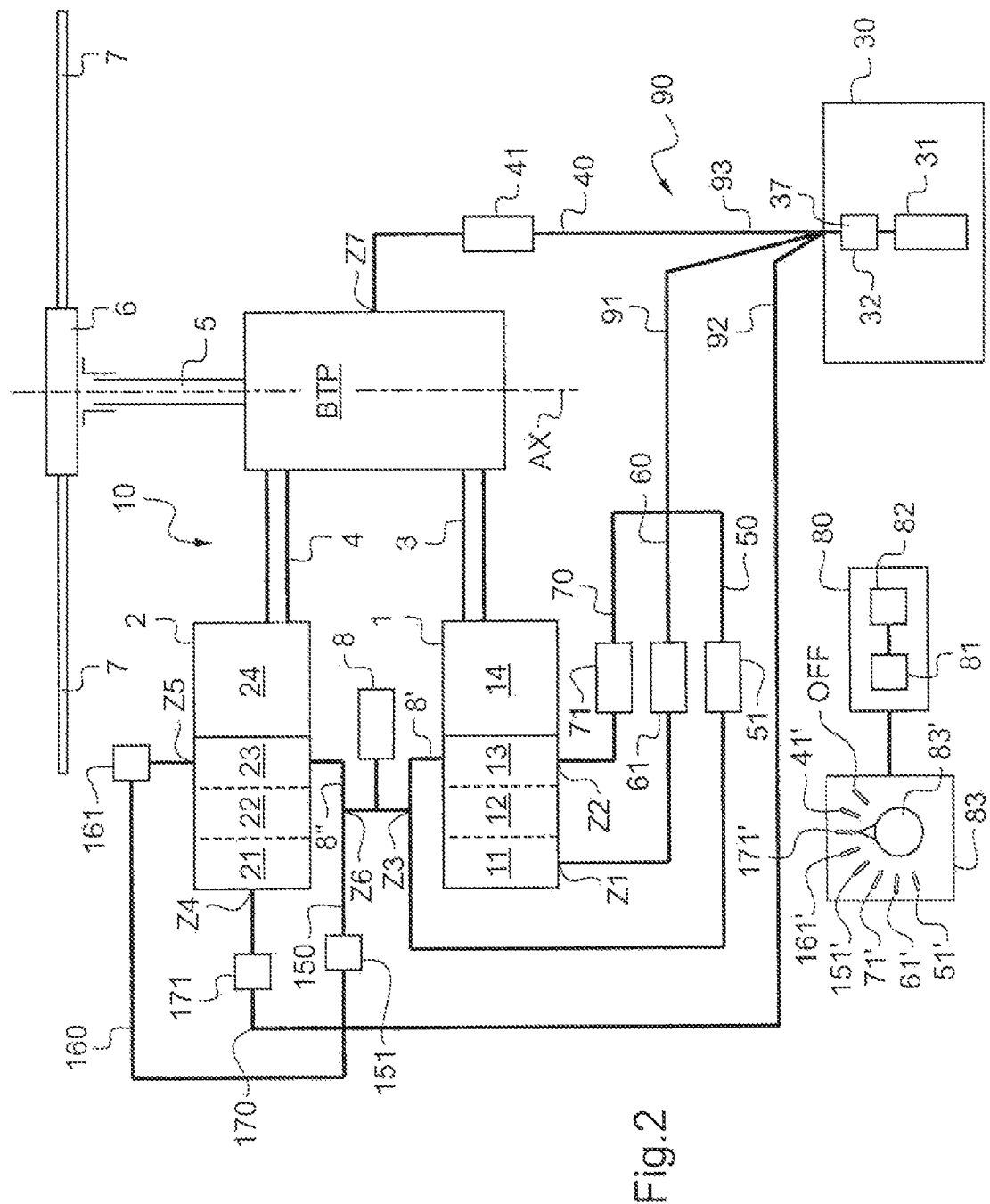
FIG. 2 shows a first embodiment provided with a reserve fitted with a bottle.

FIG. 2 shows a first embodiment provided with a reserve having one bottle, this embodiment being an embodiment that is preferred by virtue of its simplicity.

The power plant shown comprises first and second heat engines 1, 2 of the turbine engine type. These first and second heat engines 1, 2 are fed with fuel from a fuel tank 8 via respective first and second fuel feed pipes 8' and 8".

Thus, the first heat engine 1 is provided with a first gas generator comprising in succession a first air inlet 11, a first compressor 12, with a first combustion chamber 13, a first turbine connected to the first compressor 12 optionally being located at the outlet from the first combustion chamber 13. A first free turbine stage 14 is located downstream from the first gas generator, i.e. after the first combustion chamber 13 or the first turbine, as appropriate.

Similarly, the second heat engine 2 is provided with a second gas generator comprising in succession a second air inlet 21, a second compressor 22 with a second combustion chamber 23, a turbine connected to the second compressor 22 possibly being located at the outlet from the second combustion chamber 23. A second free turbine stage 24 is located downstream from the second gas generator, i.e. after the second combustion chamber 23 or after the second turbine, where appropriate.

Furthermore, the power plant 10 possesses a reserve 30 containing a water-based fluid suitable for being injected into each heat engine 1, 2 via at least one injection zone, and optionally into the inside of the gearbox BTP via at least one injection zone.

Thus, the power plant 10 includes a hydraulic connection connecting the reserve 30 to each injection zone Z1, Z2, Z3, Z4, Z5, Z6, and Z7, main closure means being arranged between each injection zone Z1, Z2, Z3, Z4, Z5, and Z6, of the heat engines and the reserve 30, and secondary closure means being arranged between each injection zone Z7 of the gearbox BTP and the reserve 30.

Figure 3:
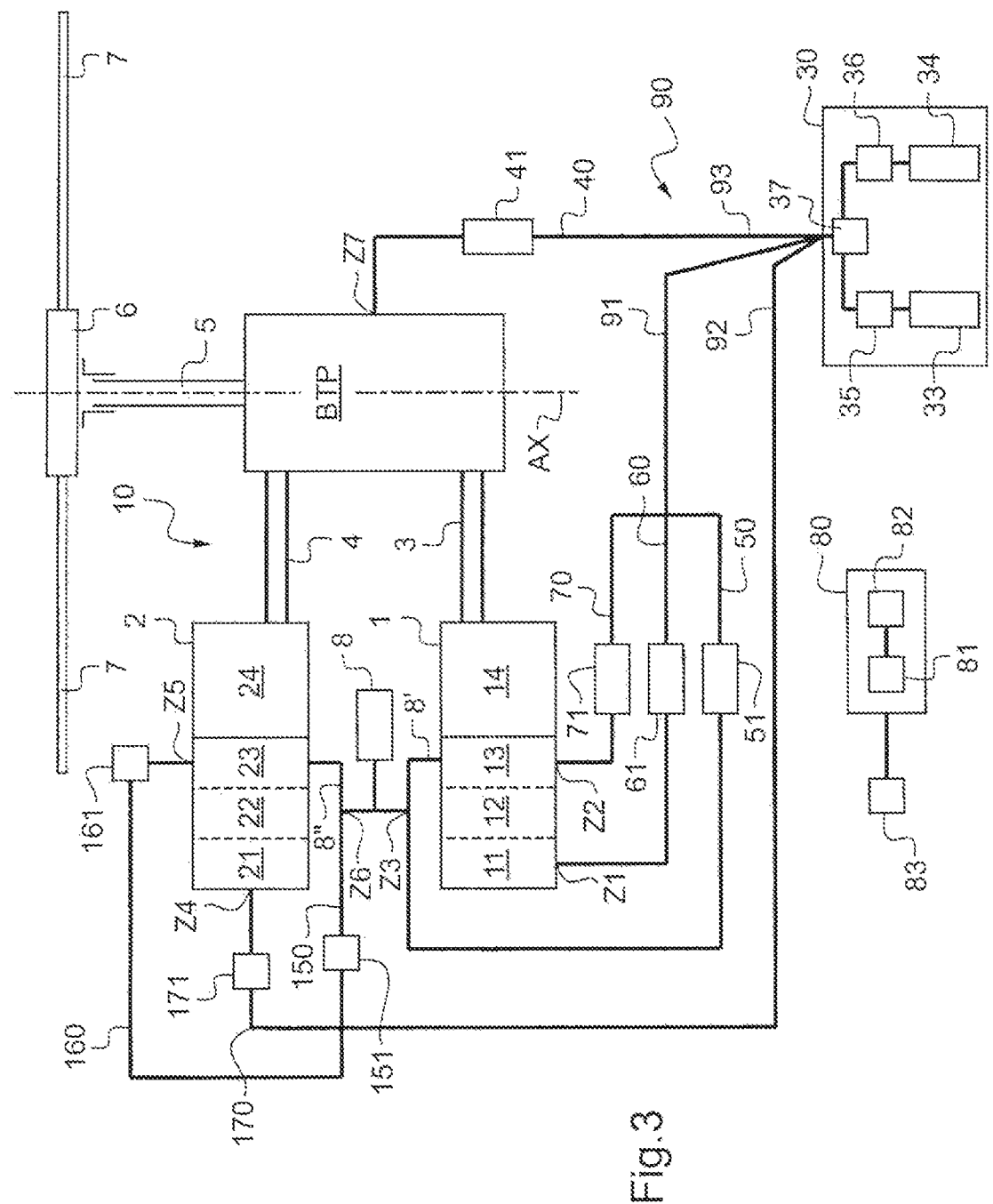
FIG. 3 shows a second embodiment provided with a reserve fitted with two bottles.

With reference to FIGS. 2 and 3 in a first variant, the hydraulic connection includes a first intermediate connection 91 leaving the reserve 30 and leading towards the first heat engine 1, this first intermediate connection 91 being a pipe, for example.

Since the first heat engine is a turbine engine, the first intermediate connection 91 is advantageously extended by a first injection pipe 50 having a main admission valve 51 of main closure means opening out into an injection zone Z3 of the first fuel feed pipe 8' feeding the first combustion chamber 13. In addition, the first intermediate connection 91 is also connected to a second injection pipe 70 provided with a main admission valve 71 of main closure means opening out directly into an injection zone Z2 of the first combustion chamber 13. Finally, the first intermediate connection 91 is connected to a third injection pipe 60 provided with a main admission valve 61 of main closure means opening out into an injection zone Z1 of the first air inlet 11.

Under such circumstances, each injection zone Z1, Z2, Z3 of the first heat engine is thus separated from the reserve 30 by main closure means suitable for preventing or allowing fluid to pass from the reserve to the first heat engine 1.

Similarly, the hydraulic connection includes a second intermediate connection 92 going from the reserve 30 towards the second heat engine 2, this second intermediate connection 92 being a pipe, for example. Since the second heat engine 2 is a turbine engine, the second intermediate connection 92 is advantageously extended by a second injection pipe 150 provided with a main admission valve 151 of main closure means opening out into an injection zone Z6 of a second fuel feed pipe 8" feeding the second combustion chamber 23. In addition, the second intermediate connection 92 is connected to a second injection pipe 160 provided with a main admission valve 161 of main closure means opening out directly into an injection zone Z5 of the second combustion chamber 23. Finally, the second intermediate connection 92 is connected to a third injection pipe 170 provided with a main admission valve 171 of main closure means opening out into an injection zone Z4 of the second air inlet 21.

Under such circumstances, each injection zone Z4, Z5, and Z6 of the second heat engine is thus separated from the reserve 30 by main closure means suitable for preventing or allowing a fluid to pass from the reserve to the second heat engine 2.

Finally, the hydraulic connection includes a third intermediate connection 93 going from the reserve 30 and extended by a duct 40 and secondary closure means opening out into an injection zone Z7 of the gearbox BTP provided with at least one fluid injection nozzle. The duct 40 is then provided with secondary closure means 41.

Each injection zone is thus separated from the reserve by an admission valve of closure means, two different valves being physically distinct and constituting two different pieces of equipment.

It is possible to implement only one or two of the above-described three injection pipes 50, 60, 70, for example.

In the first embodiment of FIG. 1, the reserve 30 includes a single bottle 31 filled with a fluid and possibly a transfer pump 32 or some other pressurizing system, in particular systems as described in document FR 2 826 094, for example.

Furthermore, the power plant 10 is provided with a control member 80 including a processor 81 connected to a memory 82.

The control member 80 is electrically connected to the main admission valves 51, 61, 71, 151, 161, and 171, to the secondary admission valve 41, and to the pump 32 in order to control them so as to deliver fluid to the associated injection zone.

It should be observed that the electrical connections between the control member 80 and the main admission valves 51, 61, 71, 151, 161, and 171, the secondary admission valve 41, and the pump 32 are not shown in the figures in order to simplify them. By way of example, these electrical connections may be of the wired or of the non-wired type.

The main admission valves 51, 61, 71, 151, 161, and 171 and the secondary admission valve 41 are in a "closed" mode when in a normal configuration so as to prevent fluid from flowing from the reserve 30 to the associated injection zone.

In an automatic mode of operation, the processor 81 makes use of preprogrammed regulation relationships contained in the memory 82 in order to determine whether or not a valve ought to be opened.

For example, if the processor is advised that the first stage of the free turbine 14 of the first heat engine 1 is rotating at a speed higher than a maximum speed programmed in the memory 82, by means of sensors dedicated to this purpose, then the processor 81 opens the admission valve 51 of the first injection pipe 50 and activates the pump 32 to inject the fluid into the first combustion chamber 13 together with the fuel, at a pressure that is preprogrammed in said memory 82.

Conversely, if the processor is advised that the first stage of the free turbine 14 of the first heat engine 1 is rotating at a speed slower than a minimum speed programmed in the memory 82, by means of sensors dedicated for this purpose, then the processor 81 opens the admission valve 61 of the third injection pipe 60 and activates the pump 32 to inject the fluid into the second combustion chamber independently of the fuel, and at a pressure that is preprogrammed in said memory 82.

In a manual mode of operation, the pilot has control means 83 provided with a rotary knob 83'. When the rotary knob is in the OFF position, all of the valves are closed.

In contrast, when the knob is positioned in some other position one or more of the valves are opened. For example, the positions 51', 61', 71', 151', 161', 171', and 41' open the valves 51, 61, 71, 151, 161, 171, and 41 respectively.

With reference to FIG. 3, in a second embodiment, the reserve 30 includes a plurality of bottles, each provided with a pump leading to a mixer 37.

For example, the reserve 30 includes a first bottle 33 of pure water associated with a first pump 35, and a second bottle 33 associated with a second pump 36 and containing an intermediate solution comprising either antifreeze or a third mixture of at least an antifreeze and a lubricant.

Thus, when it is necessary to feed fluid to a heat engine, the processor 81 requests the mixer 37 to block the liquid coming from the second bottle. In contrast, when it is necessary to feed fluid to the gearbox, the processor requests the mixer 37 to mix the pure water of the first bottle 33 to the intermediate solution of the second bottle 34.

It should be observed that the control member 80 may be a dedicated control member, or that it may be incorporated in existing means, e.g. the member for regulating the heat engines 1 and 2.

FIGS. 2 and 3 show a variant having a plurality of main and secondary closure means that are physically distinct from one another.

Figure 4:
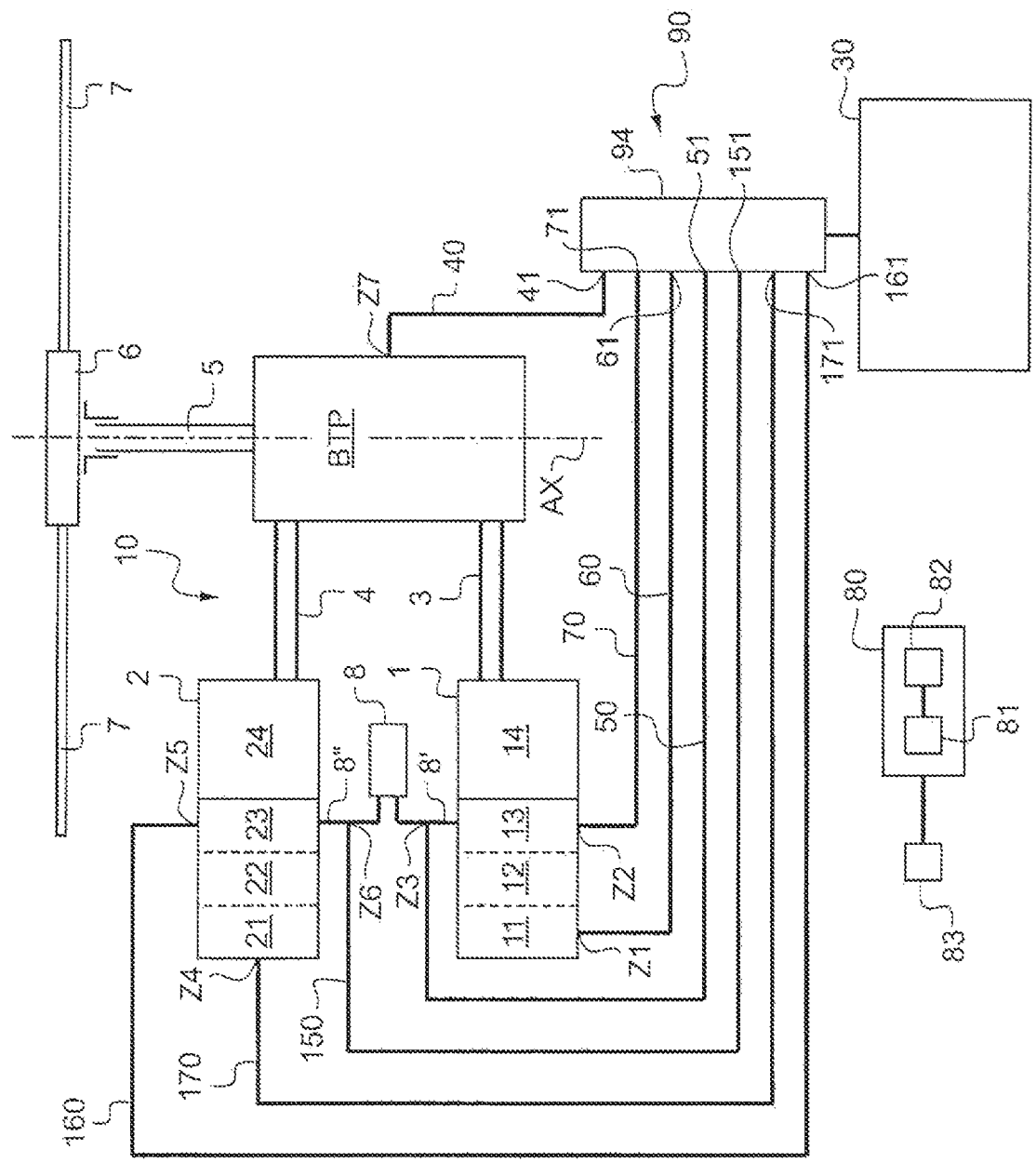
FIG. 4 shows a variant of the first and second embodiments fitted with a hydraulic distributor.

Nevertheless, with reference to FIG. 4, these main and secondary closure means could form parts of a single piece of equipment, a hydraulic distributor 94.

The hydraulic distributor may include a slide, an inlet orifice, and a plurality of outlet orifices representing the main admission valves 51, 61, 71, 151, 161, and 171, and the secondary admission valve 41. By moving the slide, the control member 80 then causes one or more of the valves to be opened, as appropriate.

The hydraulic distributor is then controlled by the control member 80 via an electrical connection, not shown.

Each main closure means is thus distinct from each secondary closure means, even if the valves all form part of a single assembly.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equipment means without going beyond the ambit of the present invention.

What is claimed is:

1. A power plant provided with a heat engine and with a gearbox and a reserve, the heat engine driving the gearbox, wherein the reserve is hydraulically connected via a hydraulic connection to the gearbox and to the heat engine to lubricate the gearbox and to increase a power of the heat engine without increasing a temperature of the heat engine or to reduce the temperature of the heat engine without reducing the power of the heat engine, the power plant including at least one main closure means between the heat engine and the reserve, and at least one secondary closure means between the gearbox and the reserve, the power plant including a control member for controlling the main and secondary closure means, the power plant including a mixer;
   wherein the reserve comprises a first bottle configured to contain pure water and a second bottle configured to contain an intermediate solution;
   wherein the control member is configured to control the mixer to only inject fluid from the first bottle into the heat engine; and
   wherein the control member is configured to control the mixer to inject fluid from the first bottle and the second bottle as a fluid mixture into the gearbox.

2. The power plant according to claim 1, wherein the at least one main closure means comprises a main admission valve, and the at least one secondary closure means comprises a secondary admission valve.

3. The power plant according to claim 1, wherein, for the gearbox including at least one member to be lubricated, the hydraulic connection includes a duct opening out into an injection nozzle directed towards the at least one member to be lubricated, the nozzle being suitable for injecting a fluid from the reserve in the form of a jet or a mist.

4. The power plant according to claim 1, wherein for the heat engine being a turbine engine having a free turbine and a gas generator, and for the gas generator comprising an air inlet and a combustion chamber into which a fuel is injected, the hydraulic connection comprises at least one injection pipe selected from a fourth list comprising at least one of the following injection pipes:
  a first injection pipe opening out into a fuel feed pipe of the heat engine in order to inject a fluid into the combustion chamber together with the fuel;
  a second injection pipe opening out into the combustion chamber in order to inject the fluid into the combustion chamber independently of the fuel; and
  a third injection pipe opening out into the air inlet.

5. The power plant according to claim 1, wherein the intermediate solution includes an antifreeze, or a combination of antifreeze and lubricant.

6. The power plant according to claim 5, wherein the reserve is provided with one transfer pump per bottle.

7. The power plant according to claim 1, wherein the at least one main closure means is distinct from the at least one secondary closure means.

8. The power plant according to claim 1, wherein the heat engine is a turbine engine having a free turbine and a gas generator.

9. The power plant according to claim 1 wherein the main and secondary closure means are provided by a hydraulic distributor, the hydraulic distributor with an inlet orifice hydraulically connected to the reserve, a first outlet orifice hydraulically connected to the heat engine, and a second outlet orifice hydraulically connected to the gearbox.

10. A power plant for a rotorcraft comprising:
  a gearbox for driving a rotary wing;
  a heat engine connected to the gearbox to drive the gearbox;
  a fluid reserve comprising a first bottle configured to contain pure water and a second bottle configured to contain an intermediate solution;
  a main valve positioned between and hydraulically connecting the fluid reserve and the heat engine;
  a secondary valve positioned between and hydraulically connecting the fluid reserve to the gearbox;
  a mixer, and
  a controller configured to control the main valve to control injecting a fluid from the fluid reserve into the heat engine and the secondary valve to control injecting the fluid from the fluid reserve into gearbox;
  wherein the controller is configured to control the mixer to only inject fluid from the first bottle into the heat engine; and
  wherein the controller is configured to control the mixer to inject fluid from the first bottle and the second bottle as a fluid mixture into the gearbox.

11. The power plant according to claim 10, wherein the heat engine is a turbine engine having a free turbine and a gas generator.

12. The power plant according to claim 11, further comprising an injection pipe hydraulically connected to the fluid reserve and the main valve to inject the fluid from the fluid reserve into the heat engine, the injection pipe positioned in one of a fuel feed pipe of the heat engine, a combustion chamber of the heat engine, and an air inlet of the heat engine.

13. The power plant according to claim 10 further comprising a transfer pump;
  wherein the transfer pump is hydraulically connected to one of the first bottle and the second bottle to pump the fluid therefrom.

14. The power plant according to claim 10 further comprising a duct fluidly connected to the fluid reserve, the duct opening out into an injection nozzle directed towards at least one member to be lubricated within the gearbox, the injection nozzle is configured to inject the fluid from the fluid reserve in the form of a jet or a mist.

15. The power plant according to claim 10 wherein the main and secondary valves are integrated into a hydraulic distributor, the hydraulic distributor with an inlet orifice hydraulically connected to the fluid reserve, a first outlet orifice hydraulically connected to the heat engine, and a second outlet orifice hydraulically connected to the gearbox.

16. The power plant according to claim 12, wherein for the injection pipe positioned in the fuel feed pipe of the heat engine, the fluid from the fluid reserve is injected together with a fuel; and
  wherein for the injection pipe positioned in the combustion chamber of the heat engine, the fluid from the fluid reserve is injected independently of the fuel.

17. The power plant according to claim 10, wherein the intermediate solution comprises one of an antifreeze, and an antifreeze and a lubricant.

18. The power plant according to claim 10, wherein the fluid from the fluid reserve is injected into the heat engine to increase a power of the heat engine without increasing a temperature of the heat engine or to reduce the temperature of the heat engine without reducing the power of the heat engine.

19. The power plant according to claim 10 further comprising a selector switch in communication with the controller, the selector switch configured to receive an order from a pilot regarding injection of the fluid into the heat engine.

20. The power plant according to claim 10, wherein the controller has a memory containing preprogrammed relationships to determine injection of the fluid into the heat engine.

* * * * *